United States Patent
Liu et al.

(10) Patent No.: US 12,483,841 B2
(45) Date of Patent: Nov. 25, 2025

(54) MEMS MICROPHONE

(71) Applicant: AAC Technologies Pte. Ltd.

(72) Inventors: Yuwei Liu, Singapore (SG); Colin Robert Jenkins, Eb (GB); Rui Zhang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 189 days.

(21) Appl. No.: 18/395,782

(22) Filed: Dec. 26, 2023

(65) Prior Publication Data
US 2024/0223966 A1 Jul. 4, 2024

(30) Foreign Application Priority Data
Dec. 29, 2022 (CN) .......................... 202223552657.8

(51) Int. Cl.
*H04R 19/04* (2006.01)
*B81B 3/00* (2006.01)
*H04R 7/04* (2006.01)
*H04R 7/18* (2006.01)

(52) U.S. Cl.
CPC ........... *H04R 19/04* (2013.01); *B81B 3/0075* (2013.01); *H04R 7/04* (2013.01); *H04R 7/18* (2013.01); *B81B 2201/0257* (2013.01); *B81B 2203/0127* (2013.01); *H04R 2201/003* (2013.01)

(58) Field of Classification Search
CPC . H04R 19/04; H04R 7/04; H04R 7/18; H04R 2201/003; H04R 19/005; B81B 3/0075; B81B 2201/0257; B81B 2203/0127; B81B 2203/0307; B81B 3/0013; B81C 2201/014
See application file for complete search history.

(56) References Cited

FOREIGN PATENT DOCUMENTS

CN 111757223 A * 10/2020 ........... H04R 19/005

* cited by examiner

*Primary Examiner* — Tuan D Nguyen
(74) *Attorney, Agent, or Firm* — Wiersch Law Group

(57) ABSTRACT

A MEMS microphone, includes a substrate with a back cavity, and a capacitive system arranged on the substrate, the capacitive includes a back plate and a diaphragm, a reinforcing portion is located between the diaphragm and the substrate, a projection of an inner surface of the reinforcing portion along a vibration direction of the diaphragm is flush with an inner surface of the back cavity or located in the back cavity, the reinforcing portion includes an etched barrier wall and a sacrificial layer located within the etched barrier wall. Compared with the related art, the MEMS microphone disclosed by the present disclosure could improve the reliability.

7 Claims, 1 Drawing Sheet

MEMS MICROPHONE

TECHNICAL FIELD

The present disclosure relates to a field of sound-electric conversion technology, in particular to a micro-electro-mechanical system (MEMS) microphone.

BACKGROUND

With rapid development of the mobile communication technology in recent years, mobile communication devices such as portable phones, portable phones capable of accessing Internet, personal digital assistants and other devices that perform communication specially utilizing communication networks are used more and more. A microphone, especially a MEMS microphone, is one of the most important units used in the above-described devices.

A micro-electro-mechanical system (MEMS) microphone is an electroacoustic transducer produced by micro-mechanical technology, with small volume, excellent frequency response characteristic, low noise and the like. As electronic devices are getting miniaturized, lightened and thinned, MEMS microphones are increasingly widely used in those devices.

The MEMS microphone in the related art includes a substrate with a back cavity and a capacitive system arranged on the substrate, the capacitive system includes a back plate and a diaphragm arranged opposite to the back plate. The diaphragm is located on a side of the back plate close to the substrate. The diaphragm will contact with an edge of the substrate during vibration, especially when it is hit hard, thus reducing the strength and reliability of the MEMS microphone.

Thus, it is necessary to provide a MEMS microphone to solve the problem.

SUMMARY

In view of the above, an objective of the present disclosure is to provide a MEMS microphone with better reliability.

In order to achieve the objective mentioned above, the present disclosure discloses a MEMS microphone, including: a substrate with a back cavity, and a capacitive system arranged on the substrate, comprising a back plate and a diaphragm opposite to the back plate, the diaphragm located between the substrate and the back plate, wherein a reinforcing portion is located between the diaphragm and the substrate, a projection of an inner surface of the reinforcing portion along a vibration direction of the diaphragm is flush with an inner surface of the back cavity or located in the back cavity, the reinforcing portion comprises an etched barrier wall and a sacrificial layer located within the etched barrier wall.

As an improvement, the MEMS microphone further comprises a connecting portion connected with the back plate and the substrate, the diaphragm is connected with an inner surface of the connecting portion.

As an improvement, the etched barrier wall comprises a first sidewall extending from the diaphragm to the substrate and a second sidewall located between the diaphragm and the substrate, the second sidewall is connected with the connecting portion and the first sidewall.

As an improvement, the etched barrier wall further comprises a plurality of retaining walls extending from the diaphragm to the substrate, the retaining walls are connected with the substrate and located between the first sidewall and the connecting portion.

As an improvement, a projection of the first sidewall along the vibration direction of the diaphragm is located in the back cavity.

As an improvement, the first sidewall is flush with the inner surface of the back cavity.

As an improvement, the etched barrier wall and the diaphragm are integrally formed.

DESCRIPTION OF EMBODIMENTS

The technical solutions in embodiments of the present disclosure will be described clearly and completely below with reference to the accompanying drawings in the embodiments of the present disclosure.

First Embodiment

Figure 1:
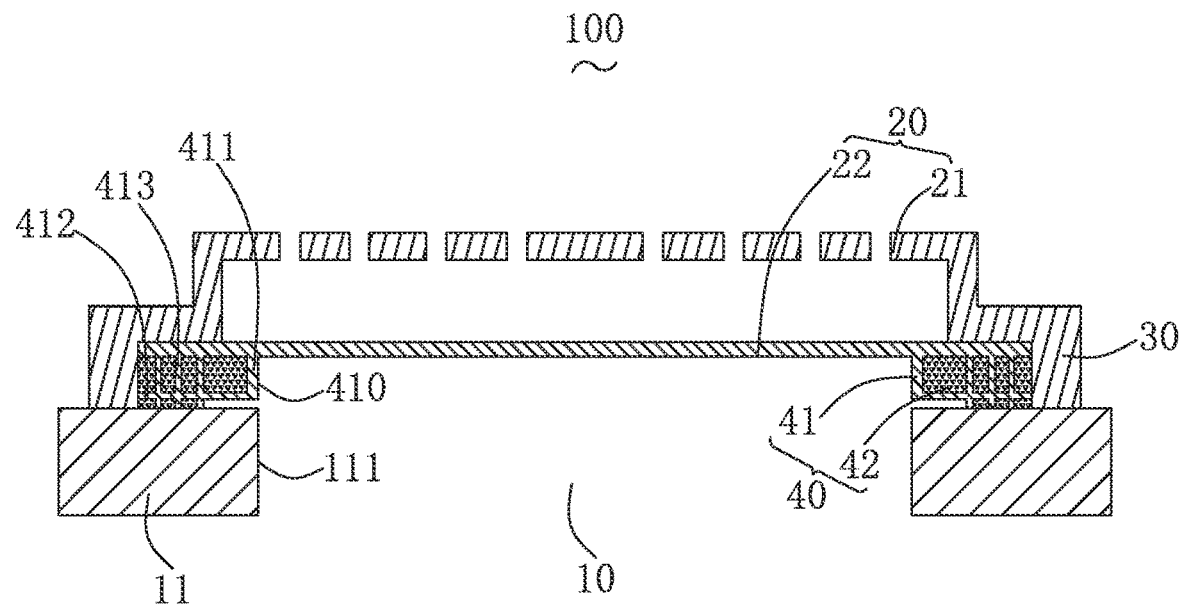
FIG. 1 is a cross-sectional view of the MEMS microphone in accordance with a first embodiment.

As shown in FIG. 1, the present disclosure discloses a MEMS microphone 100 including a substrate 10 with a back cavity 11 and a capacitive system 20 arranged on the substrate 10. The capacitive system 20 includes a back plate 21 and a diaphragm 22 opposite to the back plate 21, the diaphragm 22 is located on a side of the back plate 21 close to the substrate 10. When the sound pressure acts on the diaphragm 22, there is a pressure difference between the two sides of the diaphragm 22 facing the back plate 21 and the diaphragm 22 away from the back plate 21, so that the diaphragm 22 moves closer to the back plate 21 or away from the back plate 21, thereby causing the diaphragm 22 to move, the change of the capacitance with the back plate 21 realizes the conversion of the sound signal to the electrical signal. In addition, the MEMS microphone 100 further includes a connecting portion 30 connected with the back plate 21 and the substrate 11, the diaphragm 22 is connected with an inner surface of the connecting portion 30, the connecting portion 30 and the back plate 21 are integrally formed. In the other embodiment, the connecting portion and the back plate could be formed separately.

A reinforcing portion 40 is located between the diaphragm 22 and the substrate 11, the reinforcing portion 40 is connected with the diaphragm 22, a projection of an inner surface 410 of the reinforcing portion 40 along a vibration direction of the diaphragm 22 is flush with an inner surface 111 of the back cavity 10. Specifically, the inner surface 410 of the reinforcing portion 40 is a surface closest to the back cavity 10, the inner surface 111 of the back cavity 10 encloses a surface of the back cavity 10. The reinforcing portion 40 includes an etched barrier wall 41 and a sacrificial layer 42 located within the etched barrier wall 41. Therefore, the etched barrier wall 41 and the sacrificial layer 42 are connected with the diaphragm 22, the etched barrier wall 41 and the sacrificial layer 42 jointly serve as the reinforcing portion 40 of the diaphragm 22, thus increasing the strength of the diaphragm 22. In addition, the projection of a part of the diaphragm 22 is located in the substrate 11, the part of the diaphragm 22 is an effective area of the diaphragm 22, the effective area of the diaphragm 22 is totally connected with the reinforcing portion 40, therefore, the effective area of the diaphragm 22 will not hit the substrate 11, thus improving the reliability of the MEMS microphone 100.

The etched barrier wall 41 includes a first sidewall 411 extending from the diaphragm 22 to the substrate 11, a second sidewall 412 located between the diaphragm 22 and the substrate 11, and a plurality of retaining walls 413 extending from the diaphragm 22 to the substrate 11, the second sidewall 412 is connected with the connecting portion 30 and the first sidewall 411, the retaining walls 412 are connected with the substrate 11 and are located between the first sidewall 411 and the connecting portion 30. The etched barrier wall 40 and the diaphragm 22 are integrally formed. In the other embodiment, the etched barrier wall and the diaphragm could be formed separately.

In the present embodiment, the inner surface 410 of the reinforcing portion 40 serves as the inner surface of the first sidewall 411, that is the first sidewall 411 is flush with the inner surface of the back cavity 10.

Second Embodiment

Figure 2:
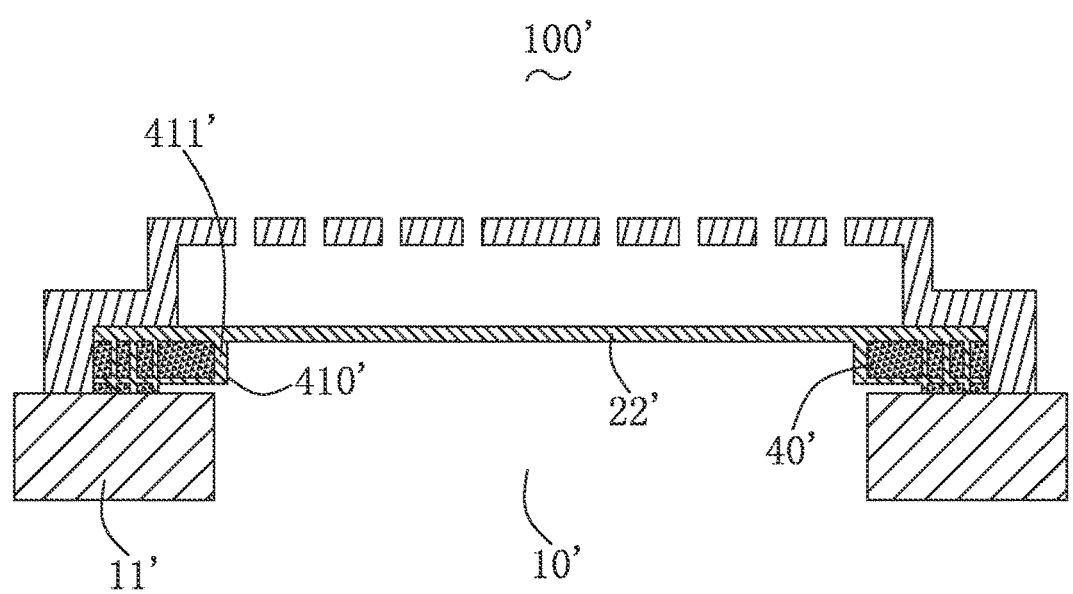
FIG. 2 is a cross-sectional view of the MEMS microphone in accordance with a second embodiment.

Referring to FIG. 2, a MEMS microphone 100' is provided by the second embodiment. The distinction between the second embodiment and the first embodiment is that, in the second embodiment, a projection of an inner surface 410' of a reinforcing portion 40' along a vibration direction of a diaphragm 22' is located in a back cavity 10'. In other words, a projection of a first sidewall 411' along the vibration direction of the diaphragm 22' is located in the back cavity 10'.

Compared with the related art, since the back plate is provided with several reinforcing ribs, which can strengthen the back plate and improve the performance of the MEMS microphone.

The above descriptions are merely some of the embodiments of the present disclosure. It should be pointed out that for those of ordinary skill in the art, improvements can be made without departing from the inventive concept of the present disclosure, shall fall within the scope of the present disclosure.

What is claimed is:

1. A MEMS microphone, comprising:
a substrate with a back cavity, and
a capacitive system arranged on the substrate, comprising a back plate and a diaphragm opposite to the back plate, the diaphragm located between the substrate and the back plate, wherein
a reinforcing portion is located between the diaphragm and the substrate, a projection of an inner surface of the reinforcing portion along a vibration direction of the diaphragm is flush with an inner surface of the back cavity or located in the back cavity, the reinforcing portion comprises an etched barrier wall and a sacrificial layer located within the etched barrier wall.

2. The MEMS microphone described as claim 1, wherein further comprises a connecting portion connected with the back plate and the substrate, the diaphragm is connected with an inner surface of the connecting portion.

3. The MEMS microphone described as claim 2, wherein the etched barrier wall comprises a first sidewall extending from the diaphragm to the substrate and a second sidewall located between the diaphragm and the substrate, the second sidewall is connected with the connecting portion and the first sidewall.

4. The MEMS microphone described as claim 3, wherein the etched barrier wall further comprises a plurality of retaining walls extending from the diaphragm to the substrate, the retaining walls are connected with the substrate and located between the first sidewall and the connecting portion.

5. The MEMS microphone described as claim 3, wherein a projection of the first sidewall along the vibration direction of the diaphragm is located in the back cavity.

6. The MEMS microphone described as claim 3, wherein the first sidewall is flush with the inner surface of the back cavity.

7. The MEMS microphone described as claim 1, wherein the etched barrier wall and the diaphragm are integrally formed.

* * * * *